United States Patent Office 3,814,824
Patented June 4, 1974

3,814,824
BREAKFAST CEREALS CONTAINING SOY MATERIAL AND SODIUM BICARBONATE
William T. Bedenk, Springfield Township, Hamilton County, and Edward R. Purves, Forest Park, Ohio, assignors to The Procter & Gamble Company, Cincinnati, Ohio
No Drawing. Filed June 28, 1971, Ser. No. 157,622
Int. Cl. A23l 1/10
U.S. Cl. 426—342                                             8 Claims

ABSTRACT OF THE DISCLOSURE

A process for making palatable ready-to-eat breakfast cereals containing soy protein. The incorporation of from 0.2 to 2.0% sodium bicarbonate in a soy protein-fortified cereal food results in the removal of objectionable soy flavor and the emergence of a high intensity, well-rounded, pleasant flavor.

BACKGROUND OF THE INVENTION

This invention relates to breakfast cereals of the ready-to-eat or cold cereal class, the two terms used herein interchangeably. By the process herein described, cereal products are produced that are highly nutritional and have excellent eating qualities.

Cereal manufacturers have long tried to incorporate a significant amount of soy protein into a cold cereal product, but until recently have been unsuccessful. A cold cereal product containing soy protein is desirable because of the enchantment of the nutritional value of the cereal resulting from the soy protein. However, the soybean possesses an unacceptable taste so that at only relatively low levels of soybean content is the characteristic soy taste undetectable. Various debittering techniques have been developed to remove the objectionable components of the soy bean, and have met with some success, but the soy material tends to suppress the natural flavor of the grain and does contribute some unpleasant flavor of its own.

Commonly assigned, copending applications Ser. No. 50,980, now Pat. No. 3,687,425, Production of Ready-to-Eat Breakfast Cereals containing Soy Flour, by Alexander L. Liepa; Ser. No. 50,925, now Pat. No. 3,687,686, High Protein Ready-to-Eat Breakfast Cereals containing Soy Concentrate, by William T. Bedenk; Ser. No. 50,924, now Pat. No. 3,689,279, High Protein Ready-to-Eat Breakfast Cereals containing Soy Isolate, by William T. Bedenk; and Ser. No. 78,274, now Pat. No. 3,753,728, Process for Production of Soy-Containing Breakfast Cereals, by William T. Bedenk and David E. O'Connor, all contain disclosures as to the treatment of soy material sources to make the breakfast cereal product containing them more palatable. However, these applications do not disclose the use of sodium bicarbonate to attain a high intensity well-rounded, pleasant flavor.

U.S. Pat. 2,329,080, "Method of Treating Soybeans," Charles A. Raymond, patented Sept. 7, 1943, and 2,795,502, "Method of Making Soy Bean Products," Charles A. Raymond, patented June 11, 1957, disclose immersing soybeans in a dilute aqueous solution of ammonium carbonate or ammonium bicarbonate to produce soybean products which are free from objectionable taste and odor. These patents do not relate to ready-to-eat breakfast cereals. U.S. Pat. 3,505,078, "Process for Preparing a Honey-Graham Flavored Cereal," Bohdan O. Hreschak, patented Apr. 7, 1970, and 3,554,763, "Preparation of Ready-to-Eat Cereal Characterized by a Honey-Graham Flavor," Bohdan O. Hreschak et al., patented Jan. 12, 1971, show the use of sodium bicarbonate in a honey-graham cereal flavor product. Canadian Pat. 847,282, "Process for Making Cereal Food Products" by Ziminski & Weiss, issued July 21, 1970, discloses the use of sodium bicarbonate in a ready-to-eat cereal food product. These patents do not relate to soy protein containing ready-to-eat breakfast cereals.

It is an object of this invention to produce a palatable, high protein content, ready-to-eat cereal. It is a further object of this invention to produce a soy protein-containing ready-to-eat breakfast cereal in which the objectionable soy flavor is suppressed. Yet another object of this invention is to produce a soy protein-containing ready-to-eat breakfast cereal which exhibits a high intensity, well-rounded, pleasant flavor. These and other objects will become apparent from the following description of the invention.

SUMMARY OF THE INVENTION

Briefly stated, this invention concerns the production of highly palatable and nutritive breakfast cereal products. More specifically, the cold cereal products of this invention comprise from 5% to 90% soy protein material, from 5% to 90% of a cooked cereal grain, and from 0.2% to 2% sodium bicarbonate to suppress the objectionable soy flavor and to bring out a high intensity, well-rounded, pleasant grain flavor. Such a product is produced by mixing sodium bicarbonate with the other ingredients at any stage of the conventional cereal flaking process except during cooking.

DETAILED DESCRIPTION OF THE INVENTION

In the present invention, there is produced a protein-enriched cold cereal product that is produced in any shape or form desired, such as shredded, puffed, crumbled, biscuit, granule, flaked, and the like. Soy protein is used as a major source of protein and is generally obtained from defatted and refined soybeans. As used herein, soy protein is generic to soy flour, soy protein concentrate, and soy protein isolate, and will be used in the description to follow. All three protein sources are commercially available and can be used interchangeably in the present invention. Soy flour contains 40% up to 70% protein, soy protein concentrate contains 70% up to 90% protein, and soy protein isolate contains 90% up to 100% protein.

The soy protein used in this invention may be subjected to a partial hydrolysis with a proteolytic enzyme. The partial hydrolysis may be accomplished by mixing the soy protein, a proteolytic enzyme, and water for a length of time at an elevated temperature as described in the above-mentioned co-pending application, Ser. No. 50,924. Following hydrolysis the soy protein is further processed into the final product. A preferred method comprises extruding the partially hydrolyzed soy protein source into strands of a relatively small cross-sectional area, pelletizing the strands, flaking, and puffing, or immediately puffing after pelletizing. Additional steps such as toasting or coating can be added to further enhance the product's taste and/or appearance.

In accordance with this invention, the soy protein material is admixed with a cereal grain such as corn, sorghum, wheat, rice, oats, or mixtures thereof. The cereal grain should be cooked. The cooking of the cereal is performed under conditions similar to those commonly used in the industry. Thus, either a batch cooking or continuous cooking operation is used. Different methods of cooking include heating at atmospheric pressure in an agitated kettle, heating at elevated pressure in a rotary cooker, and heating under high pressure in a continuous mixer-extruder. It is preferred that less than 5% water be present in the cooked cereal grain prior to mixing with the soy protein material. The cooked grits should be ground to a particle size at least as small as that of corn flour to allow bigger puffing and a more appealing product. For a more detailed discussion of the cooking of the cereal grain, see the above-mentioned, co-pending application Ser. No. 50,924.

The soy protein material is admixed with the cooked cereal grain to form a soy-containing cereal dough. The amount of soy material ranges from 5% to 90% of the total weight of the cereal dough, and the amount of cooked cereal grain ranges from 5% to 90% of the total weight of the cereal dough. Other ingredients such as sugar, salt, flavorings, coloring, spices, vitamins, minerals, and anti-sticking agents can be added to the dough.

Surprisingly, it has been found that the incorporation of from about 0.2% to about 2%, by weight of the total cereal ingredients, of sodium bicarbonate in the above-described breakfast cereal products results in the elimination of the undesirable soy flavor and the emergence of a high intensity, well rounded, pleasant flavor. The flavor is not the type of flavor normally associated with sodium bicarbonate. If less than 0.2% sodium bicarbonate is incorporated, the undesirable soy flavor is not eliminated. If more than 2% sodium bicarbonate is incorporated in the cereal product, an undesirable flavor, different from that of the soy material, is obtained. The Example demonstrates the effect of sodium bicarbonate on the flavor of breakfast cereal flakes made by the above-described process.

The sodium bicarbonate may be added at any point in the above described process, but preferably not during the cooking of the cereal grain if the product color is important. If the sodium bicarbonate is added to the dough while it is being cooked, the dough will become excessively dark in color. The sodium bicarbonate may be added to the soy protein material before it is blended into the cooked cereal grain, the sodium bicarbonate may be added to the cooked cereal grain before it is blended with the soy protein material, or the sodium bicarbonate may be added to the cooked cereal grain dough after the soy protein material has been blended in.

In the production of a cold breakfast cereal, containing soy protein and cooked cereal grains, various general procedures used for making such food products are utilized depending upon the desired form, type, or condition of the final product. Typically, a cereal dough is extruded into strands of a relatively small cross-sectional area and thereafter sliced into small links, thereby forming pellet-like particles. If a flake-type cereal product is desired, the next step after pelletizing is to mechanically modify the pellets to a flake form. This can be accomplished by passing the pellets between a pair of cooperating rollers or a roller and a flat surface spaced apart a distance sufficient to produce the desired flake thickness, which generally is in the range from 0.007" to 0.012." Generally, the flakes are then puffed to enhance their crispness and tenderness. A cereal is puffed by causing trapped moisture in the flake to expand very rapidly from the liquid state to the vapor phase. Rapid heating or a rapid decrease in the pressure are the methods commonly used to convert dense hard flakes into more palatable porous tender flakes. A toasting operation is generally employed to enhance the color and flavor of the resultant protein-fortified cereal product. Toasting is accomplished by heating the flakes, usually to 200° F.–300° F. If a puffed pellet-shaped product is desired, the flaking step should be omitted and a puffing process, such as slow puffing, oven puffing, or gun puffing, should be substituted. For a more detailed description of the above-described processess, see the above-mentioned co-pending application, Ser. No. 50,924.

The above-described process produces protein-fortified ready-to-eat breakfast cereal products which exhibit a superior flavor. Undesirable soy flavor is not noticeable and the flavor of the cereal is highly intensified.

The following example is given for the purpose of illustrating the production of the novel cereal products and is not intended to limit the scope of the invention in any way.

EXAMPLE 7480 grams of Brewers corn grits, 220 grams of salt, 200 grams of sugar, and 2100 grams of water are placed in a preheated rotary cooker at 260° F. The cooker is held at 18 p.s.i.g. pressure for 5 minutes and the cooked grits are discharged. The grits are dried overnight at 145° F. to a moisture content of about 4.9%. The dried grits are then hammermilled to a particle size of ¼ inch and impact milled so that the grits are finer than corn flour. The grits are then combined with Edipro N, a commercially available soy protein isolate (at least 90% protein) made by the Ralston-Purina Co., to form the base mix. The following cereal formulas are then made by mixing together the following ingredients:

| Sample | 1 | 2 | 3 | 4 | 5 | 6 |
|---|---|---|---|---|---|---|
| Base mix: | | | | | | |
| Cooked grits (grams) | 748 | 737 | 721 | 748 | 737 | 721 |
| Edipro N (grams) | 288 | 300 | 315 | 288 | 300 | 315 |
| Finished formula: | | | | | | |
| Base mix (grams) | 72.5 | 70.5 | 68.3 | 72.5 | 70.5 | 68.3 |
| Malt (grams) | 4.0 | 6.0 | 8.0 | 4.0 | 6.0 | 8.0 |
| NaHCO$_3$ | 1.0 | 1.0 | 1.0 | | | |
| L-proline (grams) | 0.4 | 0.4 | 0.4 | 0.4 | 0.4 | 0.4 |
| Sodium saccharin (milliliters) | 73 | 72 | 72 | 72 | 72 | 72 |
| Water (grams) | 15.3 | 15.3 | 15.5 | 15.3 | 15.3 | 15.5 |

Note that samples 4, 5, and 6 are the same as samples 1, 2 and 3 except that samples 4, 5, and 6 contain no sodium bicarbonate.

The samples are extruded into strands with a circular cross section of approximately 9/16 inch. These strands are then sliced into pellets of approximately 3/16 inch length. These pellets are next passed through a 2-roll mill to produce flakes of about 0.008 inch thickness and dried to a moisture content of about 10.5%. Then the flakes are salt puffed by contacting them with hot salt at 350° F. for 10 seconds. The flakes are then toasted in a hot air rotary kiln flake drier for 4 minutes at 260° F.

Samples 1, 2, and 3, which contain sodium bicarbonate, all exhibit a strong toasted malt flavor. Samples 4, 5, and 6, which do not contain sodium bicarbonate, exhibit a slightly toasted malt flavor, but also exhibit an objectionable soy note. These tests show that the addition of sodium bicarbonate depresses the soy flavor and brings out a pleasant toasted flavor in cereal flakes.

If the above-described samples are slow, oven, or gun puffed instead of flaked, the same flavor advantages are observed in the sodium bicarbonate-containing cereals.

What is claimed is:

1. A process for the production of a soy protein containing fortified ready-to-eat breakfast cereal with a lack of the characteristic soy taste which comprises
   (a) preparing a blend containing cereal food and from about 0.2% to about 2.0% sodium bicarbonate, by weight of the total cereal food ingredients; said cereal food comprising from about 5% to about 90% of a cooked cereal grain, by weight of the total food ingredients, and from about 5% to about 90% of a soy protein material, by weight of the total cereal food ingredients, and
   (b) forming said blend into toasted cereal flakes.

2. A process for the production of a protein fortified cereal food with a flavor of high intensity which comprises:
   (a) incorporating sodium bicarbonate in a soy protein material in an amount such that the sodium bicarbonate will comprise from 0.2% to 2% of the weight of the cereal food;
   (b) blending such mixture with a cooked cereal grain selected from the group consisting of corn, wheat, sorghum, rice, oats, and mixtures thereof, such that the soy protein material comprises from 5% to 90% of the weight of the cereal food and the cooked cereal grain comprises from 5% to 90% of the weight of the cereal food; and
   (c) forming such blend into toasted cereal flakes.

3. A process for the production of a protein fortified cereal food with flavor of high intensity which comprises:
   (a) mixing from 5% to 90%, by weight of the cereal food, of a soy protein material with from 5% to 90%, by weight of the cereal food, of a cooked cereal grain dough selected from the group consisting of corn, wheat, sorghum, rice, oats, and mixtures thereof;
   (b) blending such mixture with from 0.2% to 2%, by weight of the cereal food, sodium bicarbonate; and
   (c) forming the blend into toasted cereal flakes.

4. A process for the production of a protein fortified cereal food with a flavor of high intensity which comprises:
   (a) mixing from 5% to 90%, by weight of the cereal food, of a cooked cereal grain dough selected from the group consisting of corn, wheat, sorghum, rice, oats, and mixtures thereof with from 0.2% to 2%, by weight of the cereal food, sodium bicarbonate;
   (b) blending such mixture with from 5% to 90%, by weight of the cereal food, of a soy protein material; and
   (c) forming such blend into toasted cereal flakes.

5. A process for the production of a protein fortified cereal food with a flavor of high intensity which comprises:
   (a) incorporating sodium bicarbonate in a soy protein material in an amount such that the sodium bicarbonate will comprise from 0.2% to 2% of the weight of the cereal food;
   (b) blending such mixture with a cooked cereal grain selected from the group consisting of corn, wheat, sorghum, rice, oats, and mixtures thereof, such that the soy protein material comprises from 5% to 90% of the weight of the cereal food and the cooked cereal grain comprises from 5% to 90% of the weight of the cereal food; and
   (c) forming said blend into a puffed cereal product.

6. A process for the production of a protein fortified cereal food with flavor of high intensity which comprises:
   (a) mixing from 5% to 90%, by weight of the cereal food, of a soy protein material with from 5% to 90%, by weight of the cereal food, of a cooked cereal grain dough selected from the group consisting of corn, wheat, sorghum, rice, oats, and mixtures thereof;
   (b) blending said mixture with from 0.2% to 2%, by weight of the cereal food, sodium bicarbonate; and
   (c) forming such blend into a puffed cereal product.

7. A process for the production of a protein fortified cereal food with a flavor of high intensity which comprises:
   (a) mixing from 5% to 90%, by weight of the cereal food, of a cooked cereal grain dough selected from the group consisting of corn, wheat, sorghum, rice, oats, and mixtures thereof with from 0.2% to 2%, by weight of the cereal food, sodium bicarbonate;
   (b) blending said mixture with from 5% to 90%, by weight of the cereal food, of a soy protein material; and
   (c) forming said blend into a toasted cereal product.

8. A process for the production of a soy protein containing fortified ready-to-eat breakfast cereal with a lack of the characteristic soy taste which comprises:
   (a) preparing a blend containing cereal food and from about 0.2% to about 2.0% sodium bicarbonate, by weight of the total cereal food ingredients; said cereal food comprising from about 5% to about 90% of a cooked cereal grain, by weight of the total food ingredient, and from about 5% to about 90% of a soy protein material, by weight of the total cereal food ingredient; and
   (b) forming said blend into a puffed cereal product.

References Cited
UNITED STATES PATENTS

| | | | |
|---|---|---|---|
| 3,076,710 | 2/1963 | Koolhaas | 99—90 HP |
| 3,027,258 | 3/1962 | Markakis et al. | 99—81 |
| 2,436,519 | 2/1948 | Luke | 99—83 |
| 2,478,438 | 8/1949 | Thompson et al. | 99—83 X |
| 1,088,741 | 3/1914 | Stephens | 99—98 |

RAYMOND N. JONES, Primary Examiner

U.S. Cl. X.R.

426—141, 142, 342, 351, 446, 449, 361